March 8, 1927.
H. POWERS
CONCRETE MIXER
Filed Feb. 1, 1926
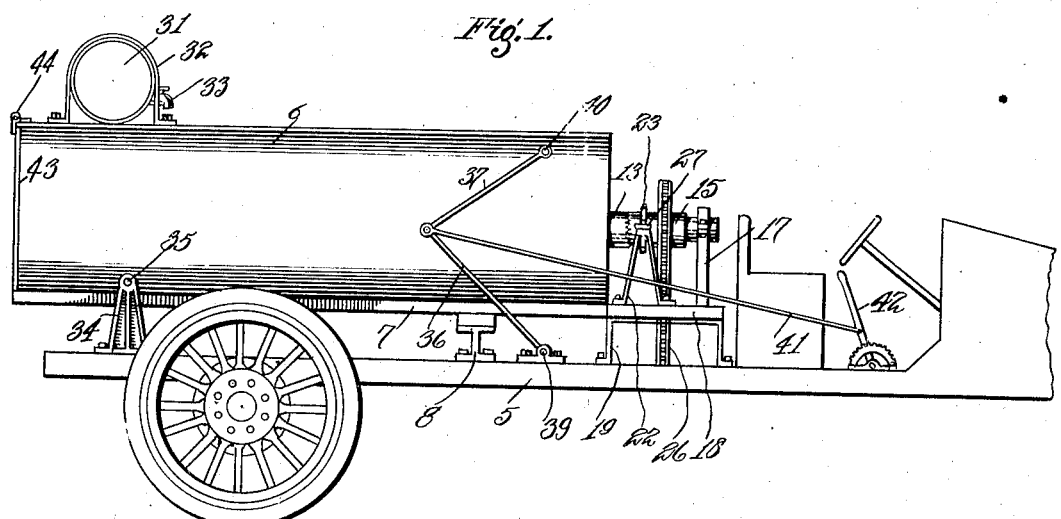
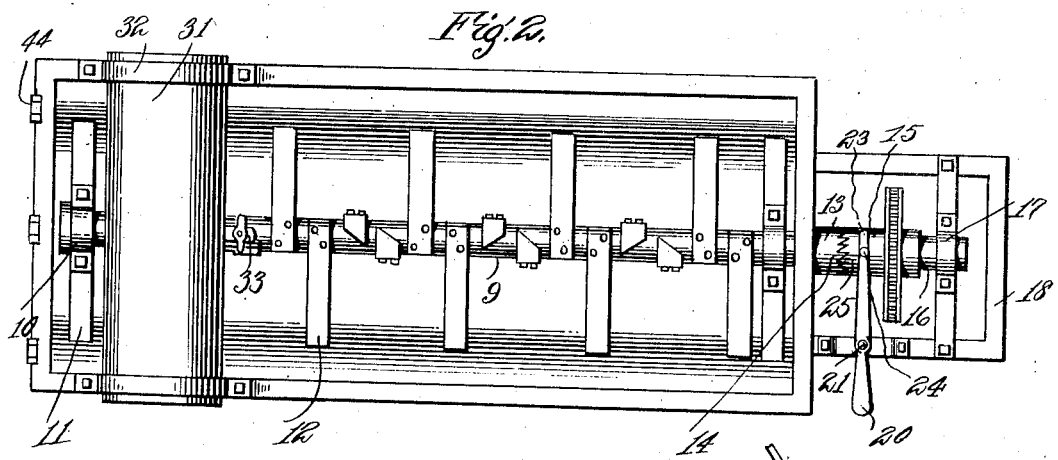
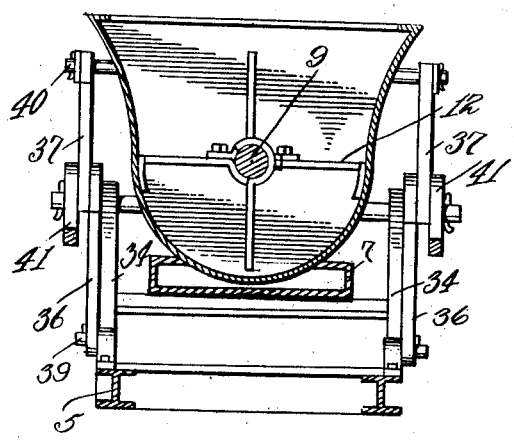
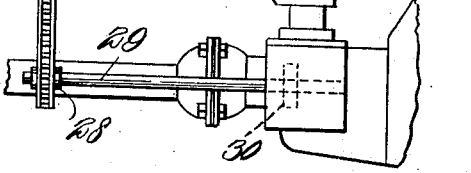
Inventor
Howard Powers.
By Adam E. Fisher.
Attorney Patented Mar. 8, 1927.

1,620,287

UNITED STATES PATENT OFFICE.

HOWARD POWERS, OF MARIETTA, OHIO.

CONCRETE MIXER.

Application filed February 1, 1926. Serial No. 85,147.

My invention relates to a concrete mixer and more particularly to a vehicle body adapted to be utilized for the mixing of concrete.

The primary object of the invention is to provide a vehicle body having a mixing element operated by the engine of the vehicle, whereby concrete may be mixed while being hauled from the supply house to the place where it is to be used.

A further object of the invention is to provide a device of the above-mentioned character which is simple and durable in construction, reliable and efficient in operation, and inexpensive to manufacture.

Other objects and advantages of the invention will be apparent during the course of the following description.

In the accompanying drawing, forming a part of this specification and in which like numerals are employed to designate like parts throughout the same, Fig. 1, is a side elevation of my improved vehicle body mounted on the chassis of a motor vehicle, Fig. 2, is a top plan view of the body.

Fig. 3, is a cross sectional view of the same, and,

Fig. 4, is a detail view showing the connection between the drive chain and transmission of the vehicle.

In the drawing, wherein for the purpose of illustration I have shown a preferred embodiment of my invention, the numeral 5 denotes the chassis of a conventional type of motor vehicle, on which my improved body 6 is mounted. The body is preferably constructed of metal and is substantially U-shape in cross section, being mounted on the frame 7 which normally rests on the I beam 8 extending transversely of the chassis and connected therewith. A mixing element is disposed within the body consisting of a longitudinal shaft 9 journaled at each end in bearings 10 carried by the cross bars 11 secured to the sides of the body. A plurality of dashers 12 are connected to the shaft at spaced intervals, extending radially therefrom at right angles to each other. The forward end of the shaft extends through the end of the body and has a collar 13 fixedly mounted on the end thereof having a series of teeth 14 formed around its peripheral edge. A clutch sleeve 15 is slidably mounted on the stub shaft 16 mounted at one end in the bearing 17 supported by the frame 18. The sleeve 15 is keyed to the shaft 16, so as to revolve therewith and is in longitudinal alinement with the collar 13. The frame 18 is supported by the brackets 19 mounted on the chassis and is disposed on a plane with the main frame 7. A clutch operating lever 20 is horizontally pivoted, as at 21, to the support 22 mounted on the side of the frame 18. The inner end of the lever 20 has a yoke 23 formed integral therewith which is pivotally connected with the clutch sleeve, as at 24, whereby the teeth 25 formed around the outer peripheral edge of the sleeve are moved into and out of engagement with the teeth 14 of the collar 13. Thus, it is seen that the clutch serves as a means for establishing or breaking connection between the main shaft 9 and stub shaft 16.

Power is transmitted to the stub shaft from the engine of the vehicle, through the medium of the endless chain 26 which is trained around the gear wheel 27 mounted on the clutch sleeve 15 and the gear 28 mounted on the extended end of the shaft 29 leading from the transmission 30 of the vehicle, as more clearly shown in Fig. 4.

A water tank 31 is mounted across the top of the body by U-shaped straps 32 secured to the edges thereof and is provided with a faucet 33 for discharging the water into the body. The transversely disposed tank 31 is located above the pivotal point of the body, with its center of gravity to the rear of the said pivotal point.

To facilitate the dumping of the concrete the rear end of the body is pivotally connected with the standards 34, as at 35, mounted on the chassis. A toggle consisting of a pair of bars 36 and 37, pivotally connected together as at 38, have their free ends respectively connected to the body and chassis, as at 39 and 40. When the body is disposed in a horizontal position the rods are out of line and when moved to a vertical line by the pull rod 41 connected at the joint between the rods, the forward end of the body will rise. The pull rod 41 is connected with a lever 42 mounted adjacent the driver's seat which actuates the pull rod to tilt the body. The upper portions of the sides of the U-shaped body are flared laterally, and the toggle mechanism is located substantially beneath the flared portions of the sides. A swinging end gate 43 is hinged at the top to the end of the body, as at 44, and automatically opens when the body is tilted.

In use, the body is filled with the proper amounts of gravel, sand, cement and water and when the engine of the vehicle is started the clutch is thrown in causing the mixing element to rotate and thereby, mix the concrete. Thus, it is seen that when the truck reaches the place where the concrete is to be used, the concrete will be ready for immediate use and upon disconnection of the clutch with the shaft of the mixing element, the lever 42 is actuated to tilt the body and dump the concrete.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus, described my invention, I claim:—

1. In a device of the character described, the combination with the chassis of a motor vehicle, of a body extending longitudinally of the chassis and pivoted at a point between its center and the rear and upon the chassis and tiltable rearwardly to discharge its contents, a transversely disposed water tank mounted upon the top of the body and located above the pivotal point thereof and having its center of gravity slightly in rear of the vertical plane of the pivot of the body to partially counterbalance the same and having means for discharging its contents into the said body, and means connected with the body in advance of the pivotal point for swinging the said body on its pivot to dump the body and return the same to its normal position.

2. In a device of the character described, the combination with the chassis of a motor vehicle, of a substantially U-shaped body extending longitudinally of the chassis and pivotally mounted upon the rear portion of the same and having its sides flared outwardly laterally of the body, toggle levers located in opposite sides of the body and connected with the same and with the chassis at the front portion of the said body, said toggle levers being located partially beneath the flared portions of the sides of the body and protected by the overhanging of the same, an operating device located at the front of the chassis, and means for connecting the toggle levers with the operating device.

3. In a device of the character described, the combination with the chassis of a motor vehicle, of spaced brackets mounted on the chassis at the rear portion thereof, a body extending longitudinally of the chassis and pivotally mounted at the rear portion between the said brackets, a transverse support mounted upon the chassis in advance of the brackets and arranged to support the front portion of the body to maintain the same normally in a horizontal position, a rotary agitator mounted within the body and extending longitudinally thereof and carried by the same, said agitator having a shaft extending through the front of the body and terminating thereat, a frame mounted upon the chassis and located at the top of the body, supported by the frame and having a shaft located in alignment with the shaft of the agitator at the front end of the same, a clutch having sections mounted on the said shafts and being separable by both relative lateral and longitudinal movement to start and stop the agitator and also to permit the body and the agitator to swing upwardly and downwardly, one of the sections of the clutch being carried by the body in the upward and downward movement thereof.

In testimony whereof I affix my signature.

HOWARD POWERS.